United States Patent [19]

Miyakawa et al.

[11] Patent Number: 4,551,403
[45] Date of Patent: Nov. 5, 1985

[54] PHOTOSENSITIVE MATERIAL FOR ELECTROPHOTOGRAPHY

[75] Inventors: Nobuhiro Miyakawa, Abiko; Teruaki Higashiguti, Tokyo; Yumiko Sano, Ibaragi; Masatomi Funato, Sakai, all of Japan

[73] Assignee: Mita Industrial Co., Ltd., Osaka, Japan

[21] Appl. No.: 653,488

[22] Filed: Sep. 24, 1984

Related U.S. Application Data

[63] Continuation of Ser. No. 434,120, Oct. 13, 1982, abandoned.

[30] Foreign Application Priority Data

Oct. 16, 1981 [JP] Japan ................................ 56-164277

[51] Int. Cl.$^4$ .............................................. G03G 5/05
[52] U.S. Cl. ........................................ 430/58; 430/96; 430/908
[58] Field of Search .......................... 430/96, 58, 908

[56]        References Cited
U.S. PATENT DOCUMENTS 4,284,699  8/1981  Berwick et al. ................... 430/96

FOREIGN PATENT DOCUMENTS 50-15152   5/1974   Japan ................................. 430/96
164277    10/1981  Japan ................................. 430/96

Primary Examiner—John L. Goodrow
Attorney, Agent, or Firm—Sherman & Shalloway

[57] ABSTRACT

A photosensitive material for electrophotography, which comprises an electroconductive substrate and a photosensitive layer formed on the substrate. The photosensitive layer comprising a charge transfer medium and a charge-generating pigment dispersed in the mediums. The photosensitive layer contains as the matrix resin a thermoplastic polyester consisting essentially of recurring units represented by the following general formula:

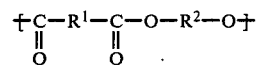

wherein $R^1$ stands for a phenylene group or an ethylene group, $R^2$ stands for a group represented by the formula

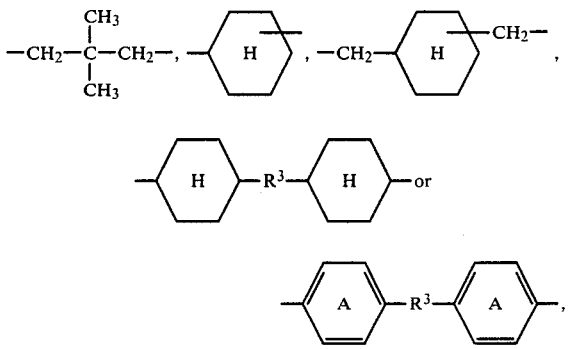

$R^3$ stands for a direct bond or a divalent bridging atom or group, and the ring A may have a substituent not participating in the reaction.

In another embodiment a photosensitive material for electrophotography includes an electroconductive substrate, a photoconductive organic pigment-containing, charge-generating layer formed on the substrate and a charge transfer layer formed on the charge-generating layer, wherein the charge transfer layer contains as the matrix resin the above-mentioned thermoplastic polyester. These thermoplastic polyesters provide improvements in adhesion to the substrate, surface hardness and abrasion resistance.

16 Claims, No Drawings

PHOTOSENSITIVE MATERIAL FOR ELECTROPHOTOGRAPHY

This application is a continuation, of application Ser. No. 434,120, filed Oct. 13, 1982 now abandoned.

BACKGROUND OF THE INVENTION

(1) Field of the Invention

The present invention relates to a photosensitive material for the electrophotography. More particularly, the present invention relates to a photosensitive material for the electrophotography, which is excellent in the electrophotographic characteristics, the adhesion to a substrate or the like, the surface hardness and the printing resistance.

(2) Description of the Prior Art

Among photosensitive materials for the electrophotography, function-separation type photosensitive materials, that is, photosensitive materials comprising an electroconductive substrate and a photosensitive layer formed on the substrate, the photosensitive layer comprising a charge transfer medium and a charge-generating pigment dispersed in the charge transfer medium, and photosensitive materials comprising an electroconductive substrate, a photoconductive organic pigment-containing, charge-generating layer formed on the substrate and a charge transfer layer formed on the charge-generating layer, have attracted attention as photosensitive materials for the electrophotography having an excellent sensitivity.

As the charge transfer medium of the function-separation type photosensitive material, there are used hole transfer substances such as poly-N-vinyl carbazole and phenanthrene, electron transfer substances such as 2,4,7-trinitro-9-fluorenone and complexes of an electron acceptor and an electron donor. When charge transfer substances are low-molecular-weight substances, they are used after they have been dispersed in various binder resins.

Among these resins, resins having a charge transfer property, such as poly-N-vinyl carbazole, are brittle and they are defective in that they are readily peeled from substrates or the like and they are insufficient in the abrasion resistance and shock resistance, and most of resins having no charge transfer property, such as ordinary thermoplastic polyesters and polycarbonates, are satisfactory in the toughness but these known resins are poor in the adhesion to an electroconductive substrate, have a low surface hardness and are not satisfactory in the abrasion resistance and printing resistance.

SUMMARY OF THE INVENTION

It is therefore a primary object of the present invention to provide a photosensitive material for the electrophotography, which is excellent in the electrophotographic characteristics, the adhesion to a substrate or the like, the surface hardness and the printing resistance.

Another object of the present invention is to provide a function-separation type photosensitive material for the electrophotography, which comprises a specific linear polyester resin as the matrix resin of the charge transfer medium.

More specifically, in accordance with one aspect of the present invention, there is provided a photosensitive material for the electrophotography, which comprises an electroconductive substrate and a photosensitive layer formed on said substrate, said photosensitive layer comprising a charge transfer medium and a charge-generating pigment dispersed in said medium, wherein the photosensitive layer contains as the matrix resin a thermoplastic polyester consisting essentially of recurring units represented by the following general formula:

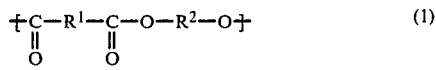

wherein $R^1$ stands for a phenylene group or an ethylene group, $R^2$ stands for a group represented by the formula

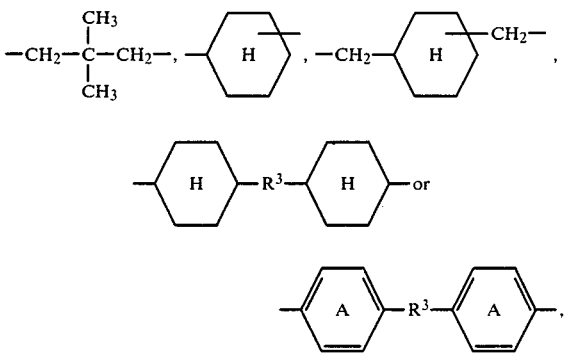

$R^3$ stands for a direct bond or a divalent bridging atom or group, and the ring A may have a substituent not participating in the reaction.

In accordance with another aspect of the present invention, there is provided a photosensitive material for the electrophotography, which comprises an electroconductive substrate, a photoconductive organic pigment-containing, charge-generating layer formed on said substrate and a charge transfer layer formed on said charge-generating layer, wherein the charge transfer layer contains as the matrix resin a thermoplastic polyester consisting essentially of recurring units represented by the following general formula:

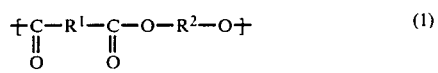

wherein $R^1$ stands for a phenylene group or an ethylene group, $R^2$ stands for a group represented by the formula

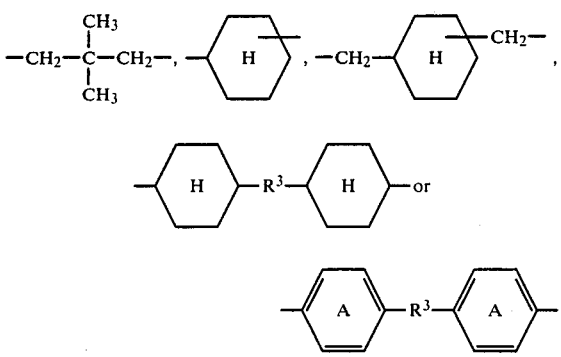

$R^3$ stands for a direct bond or a divalent bridging atom or group, and the ring A may have a substituent not participating in the reaction.

DETAILED DESCRIPTION OF THE PREFERRED EMBODIMENTS

The thermoplastic polyester that is used in the present invention has several characteristic features not possessed by polyesters which have heretofore been used as matrix resins of photosensitive layers for the electrophotography.

One of the important characteristic features of the thermoplastic polyester that is used in the present invention is that the polyester is formed by condensation of a dibasic acid component selected from benzene-dicarboxylic acids and succinic acid and a diol component selected from neopentyl glycol, alicyclic glycols and bisphenols, and the dibasic acid component and diol component are preferably chosen so that when one of the two components, for example, the dibasic acid component, contains an aromatic ring, the other component does not contain an aromatic component.

In order to improve the solubility of the polyester in a solvent and increase the compatibility of the polyester with a charge transfer substance, it is important that neopentyl glycol, an alicyclic glycol or a bisphenol should be used as the diol component. As illustrated in Examples given hereinafter, a polyester derived from a linear aliphatic diol such as tetramethylene glycol is poor in the solubility in a solvent and the formed photosensitive layer is insufficient in the electrophotographic characteristics and the adhesion to a substrate or the like.

In view of the electrophotographic characteristics such as the sensitivity and the surface hardness, it is important that the dibasic acid component of the polyester should be selected from benzene-dicarboxylic acids and succinic acid. In view of the foregoing properties, a dibasic acid having a π-electron by the carbon-to-carbon double bond, especially a benzene-dicarboxylic acid, is preferred.

In order to attain the above-mentioned objects of the present invention, that is, in order to improve the mechanical properties, adhesion and abrasion resistance of the photosensitive layer for the electrophotography without substantial reduction of the sensitivity thereof and to increase the solubility in an organic solvent and the compatibility with a charge transfer substance, it is especially preferred that one of the dibasic acid component and diol component be an aromatic component and the other component be a non-aromatic component. When a polyester in which both the dibasic acid component and diol component are aromatic components is used, it is difficult to obtain a high adhesion of the photosensitive layer to the substrate and the solubility in a solvent is often insufficient. When a polyester in which both the the dibasic acid component and diol component are non-aromatic components is used, the sensitivity of the photosensitive layer is often reduced and no improvement of the mechanical properties of the photosensitive layer can be expected. However, this does not apply to the case where an alicyclic glycol is used as the diol component. In accordance with a preferred embodiment of the present invention, by using an aromatic component as one of the dibasic acid component and diol component, the mechanical strength and other properties of the photosensitive layer can be improved without substantial reduction of the sensitivity, and by using a non-aromatic component as the other component, the solubility in a solvent and the compatibility with a charge transfer substance can be increased and the adhesion of the photosensitive layer to an electroconductive substrate or the like can be enhanced.

When succinic acid is used as the dibasic acid component in this preferred embodiment, a bisphenol represented by the following general formula:

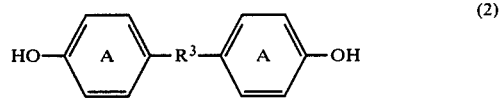

wherein $R^3$ stands for a direct bond or a divalent bridging atom or group, and the ring A may be substituted by a substituent not participating in the reaction, such as a halogen atom, is used as the diol component. As the divalent bridging atom or group, there can be mentioned an oxygen atom (=O), a sulfur atom (=S), a sulfonyl group (=SO$_2$), a carbonyl group (=CO) and a group represented by the following formula:

wherein $R_4$ and $R_5$ stand for a hydrogen atom, an alkyl group having up to 6 carbon atoms or an aryl group having up to 12 carbon atoms, and two alkyl groups $R_4$ and $R_5$ may be bonded together to form an alkylene group.

As preferred examples of the bisphenol, there can be mentioned 2,2-bis(4-hydroxyphenyl)propane (bisphenol A), 2,2-bis(4-hydroxyphenyl)butane (bisphenol B), 1,1-bis(4-hydroxyphenyl)ethane, bis(4-hydroxyphenyl)methane, 4,4'-dihydroxybiphenyl, 4-hydroxyphenyl ether and tetrabromobisphenol A, though bisphenols that can be used are not limited to those exemplified above.

In the present invention, when a benzene-dicarboxylic acid, that is, phthalic acid, isophthalic acid or terephthalic acid, is used as the dibasic acid component, an alicyclic diol or neopentyl glycol is used as the diol component. As the alicyclic diol, there may be used nucleus hydrogenation products of bisphenols represented by the above formula (2), that is, glycols represented by the following formula:

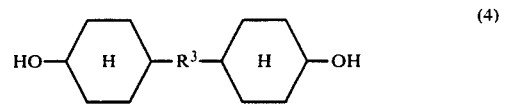

wherein $R^3$ is as defined above, and hexahydroxylylene glycol and cyclohexane glycol. Polyesters containing an alicyclic glycol as mentioned above are especially excellent in the solubility in a solvent and the adhesion to a substrate. In view of the foregoing, in the present invention, it is especially preferred that when a benzene-dicarboxylic acid is used as the dibasic acid component, an alicyclic diol be used singly or in combination with neopentyl glycol.

As preferred examples of the thermoplastic polyester that can be used in the present invention, there can be mentioned poly(1,4-cyclohexanedimethanol isophthalate), poly[2,2-bis(4-hydroxycyclohexyl)propane phthalate], poly(1,4-cyclohexane isophthalate), poly(neopentane/1,4-cyclohexanedimethanol terephthalate), poly(1,4-cyclohexane/neopentane terephthalate), poly[neopentane/2,2-bis(4-hydroxycyclohexyl)propane terephthalate/isophthalate], poly[1,4-cyclohexane/2,2-bis(4-hydroxycyclohexyl)propane isophthalate] and poly(1,4-cyclohexane/neopentane terephthalate/isophthalate).

The thermoplastic polyester that is used in the present invention has a reduced visosity of at least 0.05 dl/g, especially at least 0.1 dl/g, as determined according to the following formula:

reduced viscosity = $\eta sp/C$ wherein $\eta sp$ stands for the specific viscosity as determined at 30° C. in tetrachloroethane at a concentration of 0.5 g/dl and C stands for the concentration (0.5 g/dl) of the polyester.

A polyester especially suitable for attaining the objects of the present invention has a softening temperature of 60° to 200° C. as determined according to the ring and ball method.

The polyester that is used in the present invention is prepared according to a known polycondensation method by using the above-mentioned specific glycol as the diol component. For example, a diol component is reacted with a dibasic acid in the molten state under such conditions that water is distilled but the diol component is refluxed, if necessary under circulation of carbon dioxide gas, whereby the intended polyester can easily be obtained.

Furthermore, according to the ordinary ester exchange reaction, a dimethyl ester of a dibasic acid and a diol are heated at a temperature of 150° to 270° C. in the presence of a catalyst, and methanol formed by the ester exchange reaction is distilled and, if necessary, the excessive diol is distilled, whereby the intended polyester can easily be obtained. A known ester exchange catalyst such as an organic titanate, e.g., tetrabutyl titanate, or antimony trioxide may be used as the catalyst.

Moreover, the intended polyester can be obtained by reacting an acid chloride of a dibasic acid with a diol according to a customary interfacial polycondensation method or solution polycondensation method.

In accordance with one embodiment of the present invention, a specific polyester resin as described above is used as a matrix resin and a charge transfer substance is dissolved or dispersed in the polyester resin to form a charge transfer medium (solution), and a charge-generating pigment is dispersed in this charge transfer solution and the resulting composition is applied to an electroconductive substrate to form a photosensitive layer.

A known hole transfer substance or electron transfer substance can be used as the charge transfer substance for attaining the objects of the present invention. As preferred examples of the hole transfer substance, there can be mentioned poly-N-vinyl carbazole, phenanthrene, N-ethyl carbazole, 2,5-diphenyl-1,3,4-oxadiazole, 2,5-bis(4-diethylaminophenyl)-1,3,4-oxadiazole, bis-diethylaminophenyl-1,3,6-oxadiazole, 4,4'-bis(diethylamino)-2,2'-dimethyltriphenylmethane, 2,4,5-triaminophenylimidazole, 2,5-bis(4-diethylaminophenyl)-1,3,4-triazole, 1-phenyl-3-(4-diethylaminostyryl)-5-(4-diethylaminophenyl)-2-pyrazoline and p-diethylaminobenzaldehydo(diphenylhydrazone). As preferred examples of the electron transfer substance, there can be mentioned 2-nitro-9-fluorenone, 2,7-dinitro-9-fluorenone, 2,4,7-trinitro-9-fluorenone, 2,4,5,7-tetranitro-9-fluorenone, 2-nitrobenzothiophene, 2,4,8-trinitrothioxanthone, dinitroanthracene, dinitroacridine and dinitroanthraquinone.

Known organic and inorganic photoconductive pigments can be used as the charge-generating pigment. Among these pigments, photoconductive organic pigments such as phthalocyanine pigments, perylene pigments, quinacridone pigments, pyranthrone pigments, dis-azo pigments and tris-azo pigments are preferably used singly or in combination.

The polyester as the matrix and the charge transfer substance are preferably used in such amounts that the polyester/charge transfer substance weight ratio is in the range of from 8/2 to 3/7, especially from 7/3 to 4/6. It is preferred that the charge-generating pigment be used in an amount of 1 to 30 parts by weight, especially 4 to 20 parts by weight, per 100 parts by weight of the sum of the polyester and the charge transfer substance.

In the present invention, as the electroconductive substrate on which the photosensitive layer is formed, there can be used foils, plates, sheets and drums of metals such as aluminum, copper, tin and tinplate. Furthermore, there can be used substrates formed by applying a metal as mentioned above to a film such as a biaxially drawn polyester film or a glass sheet by vacuum deposition, sputtering or non-electrolytic plating, and "Nesa" glass.

The polyester that is used in the present invention is characterized in that the polyester is easily soluble in solvents capable of dissolving charge transfer substances therein, for example, cyclic ethers such as tetrahydrofuran and dioxane, N,N-di-substituted amides such as dimethyl formamide, and chlorine type solvents such as tetrachloroethane. Accordingly, the polyester resin and the charge transfer substance are dissolved in a solvent as mentioned above, the charge-generating pigment is dispersed in the resulting solution, and the resulting coating composition is coated on the electroconductive substrate.

It is preferred that the thickness of the coating layer be 5 to 50 microns in the dry state.

In accordance with another embodiment of the present invention, a charge-generating layer containing the above-mentioned charge-generating pigment is formed on the electroconductive substrate, and a charge-transfer layer containing the polyester matrix resin is formed on the charge-generating layer. The charge-generating layer may be formed by vacuum-depositing the above-mentioned charge-generating pigment on the substrate or coating a dispersion of the above-mentioned charge-generating pigment in an appropriate organic solvent on the substrate and drying the coating. Furthermore, the charge-generating layer may be formed by coating a composition obtained by dispersing the charge-generating pigment in a binder resin on the electroconductive substrate.

A composition which is prepared in the same manner as adopted for formation of the coating composition in the above-mentioned first embodiment except that the charge-generating pigment is not used is employed for formation of the charge transfer layer.

The polyester specified in the present invention brings about various advantages when it is used for this photosensitive material of the charge-generating layer/charge-transfer layer type. For example, as pointed out hereinbefore, the polyester excells in various properties such as the adhesion to the substrate, the toughness and the surface hardness. Moreover, the polyester is easily soluble in various solvents. Accordingly, the combination of the solvent and resin can be chosen in a very broad region.

From the viewpoints of the easiness in manufacturing and the durability, it is preferred that a charge-generating pigment/binder composition be applied for formation of the charge-generating layer on the substrate. In the present invention, however, there may be adopted a method in which a certain polyester resin selected from the above-mentioned polyesters is used as the matrix resin of the charge transfer layer and a different polyester resin selected from the above-mentioned polyesters is used as the matrix resin of the charge-generating layer. In this case, the two polyester resins are selected so that the solubility of the matrix resin of the charge-generating layer in an organic solvent is lower than that of the matrix resin of the charge transfer layer.

For example, a polyester resin which is soluble in a chlorine type solvent such as tetrachloroethane but hardly soluble or insoluble in tetrahydrofuran or cyclohexane is selected as the polyester resin of the charge-generating layer, a polyester resin soluble in tetrahydrofuran or cyclohexanone is selected as the polyester resin of the charge transfer layer, and both the polyester resins are used in combination.

In view of the foregoing, as the polyester of the charge transfer layer, there may be used (i) a polyester comprising an alicyclic glycol as the diol component and (ii) a copolyester in which the diol component and/or the dibasic acid component comprises a plurality of components.

When the above-mentioned polyesters are used in combination, reduction of the sensitivity due to mutual dissolution of the charge-generating layer and the charge transfer layer is prevented, and the adhesion between the two layers and the adhesion to the substrate are improved and simultaneously, the mechanical properties of the photosensitive material are prominently improved.

In this embodiment of the present invention, for formation of the charge-generating layer, a composition comprising 100 parts by weight of the above-mentioned polyester resin and 20 to 400 parts by weight, especially 40 to 250 parts by weight, of the charge-generating pigment is used.

The thickness of the charge-generating layer can be changed in the range of from 0.1 micron attained by vacuum deposition to 3 microns attained in case of the resin-pigment dispersion, and it is preferred that the thickness of the charge transfer layer be 5 to 30 microns.

The polyester resin used in the present invention shows especially excellent properties when it is used as the binder for the photosensitive material of the latter type, that is, the function-separation type photosensitive material comprising a charge-generating layer and a charge-transfer layer.

The present invention will now be described with reference to the following Examples that by no means limit the scope of the invention.

SYNTHESIS EXAMPLE 1

A polyester was synthesized according to the following reaction:

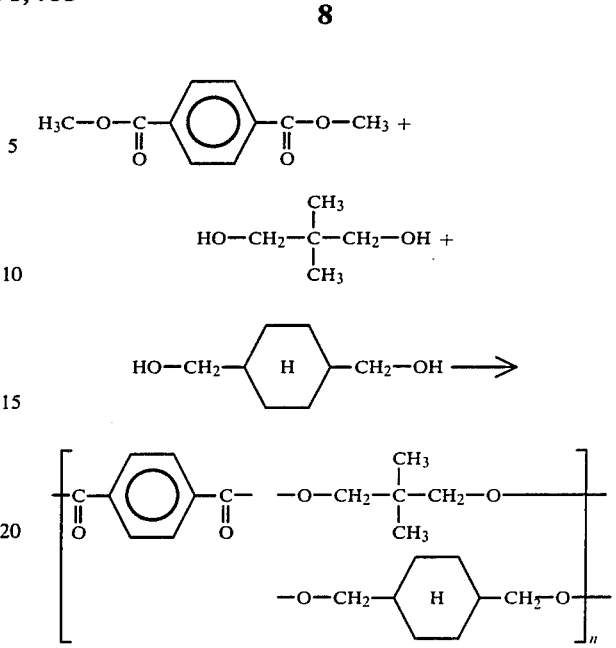

A polymerization reaction tube (having a side tube) equipped with a nitrogen introduction pipe was charged with 9.70 g (0.05 mole) of dimethyl terephthalate, 2.81 g (0.027 mole) of neopentyl glycol, 3.89 g (0.027 mole) of 1,4-cyclohexane-dimethanol, 0.1 g of tetra-n-butyl titanate and 0.05 g of antimony trioxide, and they were heated at 180° C. under atmospheric pressure in a nitrogen current for 3 hours.

Then, the reaction tube was heated at 220° C. to remove methanol completely, and the temperature was elevated to 270° to 280° C. by heating and the pressure was gradually reduced to 0.2 mmHg over a period of 15 minutes. Polymerization was completed within about 2 hours, and the reaction product was naturally cooled in nitrogen. A light-yellow transparent polymer was obtained in an amount of 12 to 13 g.

The polymer was purified accoring to customary procedures. The reduced viscosity of the purified polymer was 0.35 as measured at 30° C. in tetrachloroethane at a polymer concentration of 0.5%. The polymer had a softening point of 160° C. and was insoluble in tetrahydrofuran but soluble in tetrachloroethane.

SYNTHESIS EXAMPLE 2

A polyestrr was synthesized according to the following reaction:

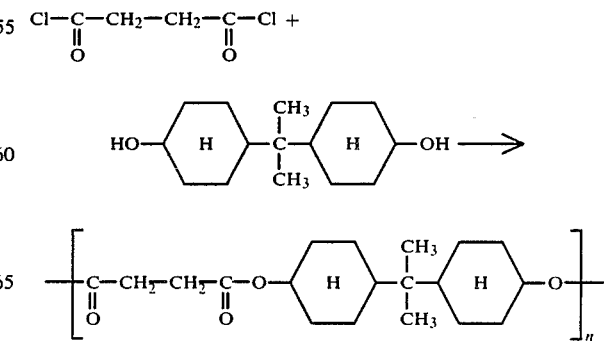

A 100-ml three-neck flask equipped with a stirrer, a hydrogen chloride discharge pipe and a nitrogen introduction pipe was charged with 7.75 g (0.05 mole) of succinic dichloride, 12.72 g (0.053 mole) of 4,4'-dihydroxycyclohexylpropane and 10 ml of o-dichlorobenzene, and the mixture was maintained at a temperature lower than 60° C. with stirring in a nitrogen gas current for 1 hour. When formation of hydrogen chloride fell off, the temperature was elevated to 100° to 120° C. to further generate hydrogen chloride. After passage of about 1 hour, the temperature was elevated to 180° C. to recover o-dichlorobenzene. Then, the temperature was elevated to 220° C. and the pressure was gradually reduced, and heating and stirring was continued under a pressure of 0.5 to 10 mmHg for 2 hours. The reaction product was cooled in a nitrogen gas current. A light-yellow transparent polymer was obtained in an amount of about 16 to about 17 g.

The polymer was purified according to customary procedures. The reduced viscosity of the purified polymer was 0.29 as measured at 30° C. in tetrachloroethane at a polymer concentration of 0.5%.

The polymer had a softening point of 150° C., and the polymer was soluble in tetrahydrofuran (THF) and methylene chloride.

SYNTHESIS EXAMPLE 3

A polyester was synthesized according to the following reaction:

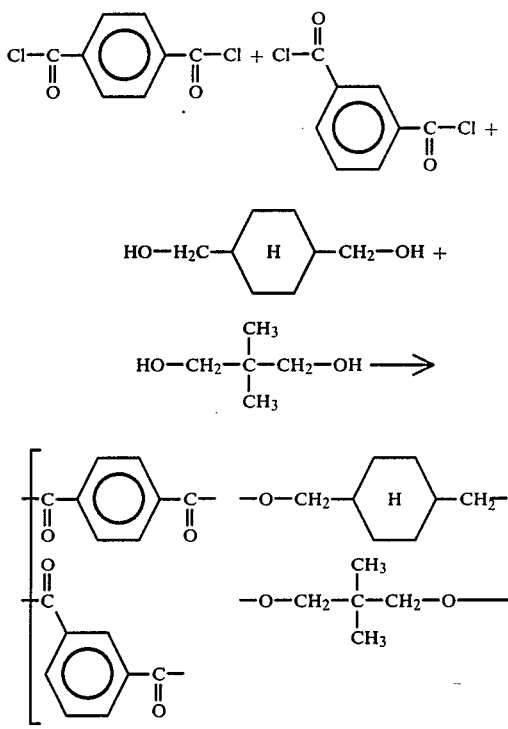

The same reaction vessel as used in Synthesis Example 1 was charged with 5.08 g (0.025 mole) of terephthalic dichloride, 5.08 g (0.025 mole) of isophthalic dichloride, 3.63 g (0.025 mole) of 1,4-cyclohexanedimethanol, 2.62 g (0.0252 mole) of neopentyl glycol and 10 cc of o-dichlorobenzene, and the mixture was maintained at a temperature lower than 80° C. in a nitrogen current for 1 hour and the mixture was stirred at 140° to 150° C. for 1 hour to remove hydrogen chloride gas. Then, the temperature was elevated to 180° C. to recover o-dichlorobenzene, and the reaction was carried out with stirring under a reduced pressure of 0.5 to 1.0 mmHg at 220° C. for 1 hour and at 250° C. for 1 hour. After completion of the reaction, the reaction product was cooled in a nitrogen current. A light-yellow transparent polymer was obtained in an amount of 14 to 15 g. The polymer was purified according to customary procedures. The reduced viscosity of the purified polymer was 0.36 as measured at 30° C. in tetrachloroethane at a polymer concentration of 0.5%.

The polymer had a softening point of 90° to 100° C. and was soluble in THF and methylene chloride.

SYNTHESIS EXAMPLE 4

A polyester was synthesized according to the following reaction:

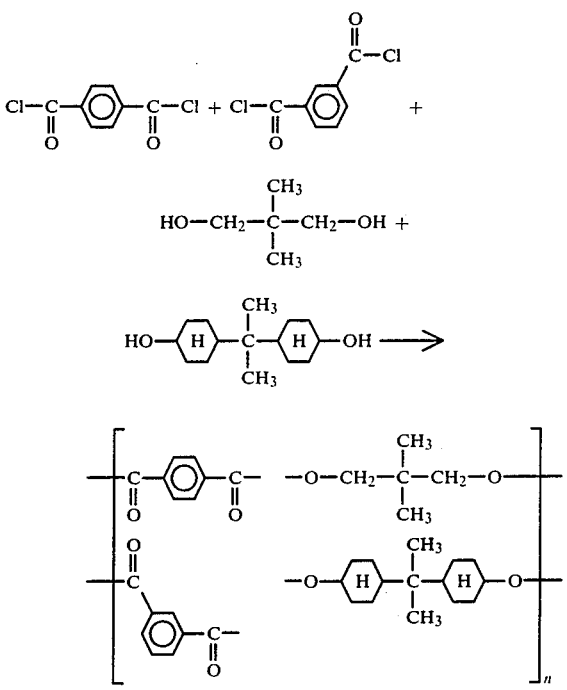

The same reaction vessel as used in Synthesis Example 2 was charged with 5.08 g (0.025 mole) of terephthalic dichloride, 5.08 g (0.025 mole) of isophthalic dichloride, 2.62 g (0.0252 mole) of neopentyl glycol and 6.05 g (0.0252 mole) of 4,4'-dihydroxycyclohexylpropane, and a light-yellow transparent polymer was obtained according to the same procedures as adopted in Synthesis Example 2.

The polymer was purified according to customary procedures. The reduced viscosity of the purified polymer was 0.36 as measured at 30° C. in tetrachloroethane at a polymer concentration of 0.5%.

The polymer had a softening point of 160° C. and was soluble in THF and methylene chloride.

SYNTHESIS EXAMPLE 5

A polyester was synthesized according to the following reaction:

$H_3COOC—CH_2—CH_2—COOCH_3$ +

-continued

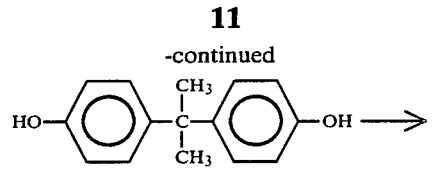

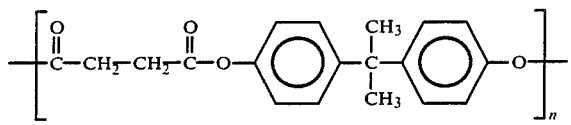

A 200-ml 4-neck flask equipped with a reflux cooler, a stirrer, a thermometer and a nitrogen introduction pipe was charged with 4.96 g (0.034 mole) of dimethyl succinate, 8.21 g (0.036 mole) of 2,2-bis(4-hydroxyphenyl)propane and 0.02 g of n-butyl titanate, and the mixture was heated at 200° C. with stirring in a nitrogen current for 3 hours. Then, the reaction mixture was heated at 220° C. for 15 minutes to expel methanol, and the temperature was elevated to 270° C. and polymerization was carried out for 2.5 hour in a vacuum of 0.2 mmHg. The reaction product was cooled and the obtained light-yellow transparent polymer was dissolved in 200 ml of tetrahydrofuran. The solution was filtered and was then poured into 500 ml of methanol to precipitate the polymer. The precipitated polymer was recovered by filtration, washed with methanol and vacuum-dried at 90° C. for 10 hours. The reduced viscosity of the obtained polymer was 0.32 as measured at 30° C. in tetrachloroethane at a polymer concentration of 0.5%. The polymer had a softening point of 140° to 150° C., and the polymer was hardly soluble in THF but easily soluble in methylene chloride.

SYNTHESIS EXAMPLE 6

A polyester was synthesized according to the following reaction:

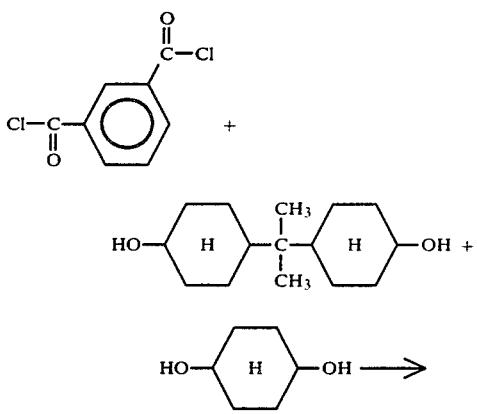

In the same manner as described in Synthesis Example 2, the polymerization was carried out by using 10.17 g (0.05 mole) of isophthalic chloride, 6.05 g (0.0252 mole) of 2,2-bis(4-hydroxyhexyl)propane and 2.90 g (0.025 mole) of 1,4-cyclohexane diol, to obtain a light-yellow transparent polymer.

The polymer was purified according to customary procedures. The reduced viscosity of the purified polymer was 0.38 as measured at 30° C. in tetrachloroethane at a polymer concentration of 0.5%. The polymer had a softening point of 170° C. and was soluble in THF and methylene chloride.

SYNTHESIS EXAMPLE 7

A polyester was synthesized according to the following reaction:

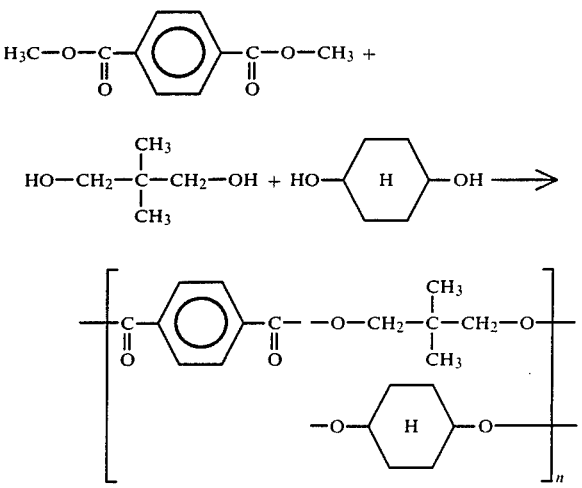

The polymerization reaction was carried out in the same manner as described in Synthesis Example 1 except that 1,4-cyclohexane diol was used instead of 1,4-cyclohexane-dimethanol, to obtain a light-yellow semi-crystalline polymer.

The polymer was purified according to customary procedures. The reduced viscosity of the purified polymer was 0.31 as measured at 30° C. in tetrachloroethane at a polymer concentration of 0.5%. The polymer had a softening point of 150° to 160° C. and the polymer was hardly soluble in THF but easily soluble in tetrachloroethane.

SYNTHESIS EXAMPLE 8

A polyester was synthesized according to the following reaction:

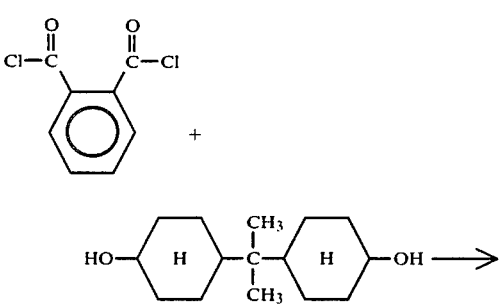

-continued

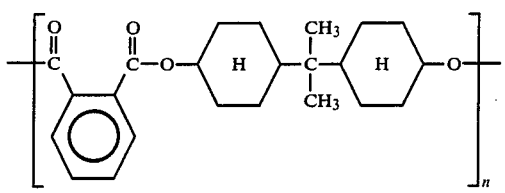

The polymerization was carried out in the same manner as described in Synthesis Example 2 except that orthophthalic dichloride was used instead of succinic dichloride, to obtain a light-yellow transparent polymer.

The polymer was purified according to customary procedures. The reduced viscosity of the purified polymer was 0.38 as measured at 30° C. in tetrachloroethane at a polymer concentration of 0.5%. The polymer had a softening point of 110° to 120° C. and was soluble in THF and methylene chloride.

SYNTHESIS EXAMPLE 9

A polyester was synthesized according to the following reaction:

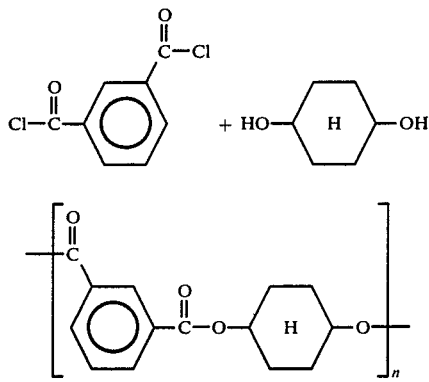

The polymerization was carried out in the same manner as described in Synthesis Example 6 except that 2,2-bis(4-hydroxycyclohexyl)propane was not used but 5.80 g (0.05 mole) of 1,4-cyclohexane diol was used, to obtain a light-yellow polymer.

The polymer was purified according to the customary procedures. The reduced viscosity of the purified polymer was 0.34 as measured at 30° C. in tetrachloroethane at a polymer concentration of 0.5%. The polymer had a softening point of 170° to 180° C. and was soluble in THF and methylene chloride.

EXAMPLE 1

In a ball mill, 5 parts by weight (all of "parts" given hereinafter are by weight) of β-type phthalocyanine (supplied by BASF A.G.), 15 parts of the polyester shown in Table 1 and 17 parts of tetrahydrofuran (hereinafter referred to as "THF") were mixed and dispersed. The resulting coating dispersion was coated on an aluminum foil having a thickness of 100μ and dried at 100° C. for 20 minutes. The formed photosensitive material was stored in the dark place overnight and used as a test sample.

The electrophotographic characteristics of the sample were examined by a commercially available surface potential meter (Model EPA-428 supplied by Kawaguchi Denki). Moreover, the peel test was carried out by using an adhesive cellophane tape, and the pencil hardness (surface hardness) was measured. The obtained results are shown in Table 1.

TABLE 1

| Polyester | Surface Potential[1] (V/μ) | Photosensitivity[2] (lux · sec) | Bonding Property[3] | Surface Hardness |
|---|---|---|---|---|
| Synthesis Example 2 | +65 | 20 | good | 2H |
| Synthesis Example 3 | +64 | 25 | good | 2H |
| Synthesis Example 9 | +60 | 20 | good | 2H |

Note
[1] The surface potential was the potential per unit thickness (μ) of the film.
[2] The photosensitivity was expressed by the quantity of light necessary for reducing the surface potential to ½.
[3] When peeling was not caused at the peel test using an adhesive cellophane tape, the bonding property was judged as being good.

In addition to the above-mentioned polyesters, polyesters synthesized by using terephthalic chloride as the dibasic acid component an tetramethylene glycol, bisphenol A or decamethylene glycol as the diol component were similarly tested. These polyesters were insoluble in THF, dimethyl formamide or dichloroethane and were slightly soluble in tetrachloroethane. The bonding property and surface hardness were insufficient and the surface potential was relatively low.

EXAMPLE 2

A sample was prepared in the same manner as described in Example 1 by using 5 parts of a dis-azo pigment having the following structure:

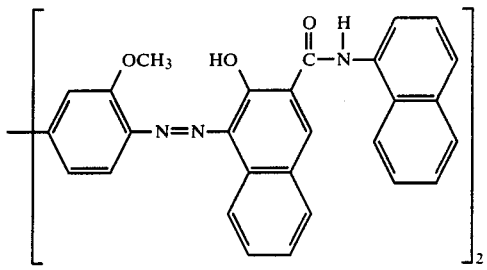

15 parts of the polyester prepared in Synthesis Example 8 and 17 parts of THF.

The sample was tested in the same manner as described in Example 1. The surface potential was +72 V/μ, the photosensitivity was 17 lux·sec and the bonding property was good and the surface hardness was 2H.

EXAMPLE 3

In a ball mill, 5 parts of the same dis-azo pigment as used in Example 2, 30 parts of the polyester prepared in Synthesis Example 2 and 20 parts of p-diethylaminobenzaldehyde were dispersed in 350 parts of THF, and the dispersion was coated on an aluminum foil and dried. When the surface potential of the sample at the time of positive charging and the photosensitivity of the sample were measured, it was found that the surface potential was 76 V/μ and the photosensitivity was 10 lux·sec. The bonding property was good and the surface hardness was 2H.

EXAMPLE 4

In a ball mill, 6 parts of Dianisidene Blue (C.I. 21180) as the dis-azo pigment and 4 parts of the polyester prepared in Synthesis Example 1 (soluble in tetrachloroethane but insoluble in THF) were dispersed in 150 parts of tetrachloroethane, and the dispersion was coated and dried on an aluminum foil to form a charge-generating layer (hereinafter referred to as "CGL") having a thickness of 0.5μ. Then, a coating solution comprising 1 part of the polyester shown in Table 2, 1 part of p-diethylaminobenzaldehyde and 13 parts of THF was coated on CGL to form a charge-transfer layer (hereinafter referred to as "CTL").

For comparison, CGL and CTL were similarly formed by using a commercially available polyester resin soluble in THF (Vylon 200 supplied by Toyobo).

The so-prepared samples were tested in the same manner ss described in Example 1. The obtained results are shown in Table 2.

TABLE 2

| Polyester | Surface Potential (V/μ) | Photosensitivity (lux · sec) | Bonding Property | Surface Hardness |
| --- | --- | --- | --- | --- |
| Synthesis Example 4 | 73 | 8.0 | good | 2H |
| Synthesis Example 5 | 80 | 9.1 | good | 2H |
| Synthesis Example 6 | 78 | 8.7 | good | 3H |
| Comparison[4] | 50 | 25 | good | H |

Note
[4]The same resin was used for both of CGL and CTL.

When the polyester obtained in Synthesis Example 7 (soluble in tetrachloroethane but hardly soluble in THF) was used as the resin for CGL instead of the polyester prepared in Synthesis Example 1, similar results were obtained.

EXAMPLE 5

CGL was formed in the same manner as described in Example 4 except that the polyester prepared in Synthesis Example 7 was used instead of the polyester prepared in Synthesis Example 1. A coating liquid comprising 1 part of polyvinyl carbazole (Tuvicol supplied by Anan Sangyo), 1 part of the polyester prepared in Synthesis Example 3 and 11 parts of THF was coated and dried on CGL to form CTL.

The obtained sample had a surface potential of 93 V/μ, a photosensitivity of 20 lux·sec, a good bonding property and a surface hardness of 2H.

What is claimed is:

1. A photosensitive material for the electrophotography, which comprises an electroconductive substrate and a photosensitive layer formed on said substrate, said photosensitive layer comprising a charge transfer medium and a charge-generating pigment dispersed in said medium, wherein the photosensitive layer contains as the matrix resin a thermoplastic polyester consisting essentially of recurring units represented by the following general formula

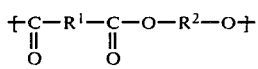

wherein $R^1$ stands for a phenylene group or an ethylene group, and $R^2$ stands for at least one group represented by the formula

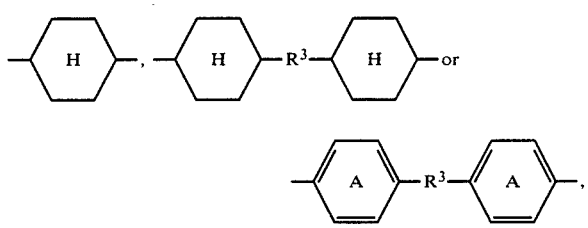

wherein the ring A may have a substituent not participating in the reaction, with the proviso that when $R^1$ stands for the ethylene group, $R^2$ stands for the group

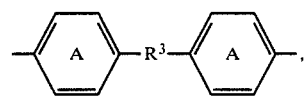

or one or both of

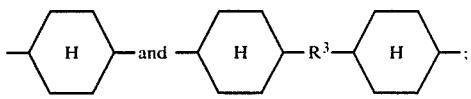

and when $R^1$ stands for the phenylene group, $R^2$ stands for one or both of

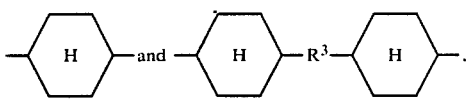

wherein $R^3$ stands for

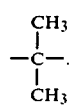

2. A photosensitive material as set forth in claim 1, wherein the photosensitive layer contains the polyester resin and the charge transfer substance at a weight ratio of from 8/2 to 3/7 and the charge-generating agent in an amount of 1 to 30 parts by weight per 100 parts by weight of the sum of the polyester and charge-transfer agent.

3. A photosensitive material for the electrophotography, which comprises an electroconductive substrate, a photoconductive organic pigment-containing, charge-generating layer formed on said substrate and a charge-transfer layer formed on said charge-generating layer, wherein the charge-transfer layer contains as the matrix resin a thermoplastic polyester consisting essentially of recurring units represented by the following general formula:

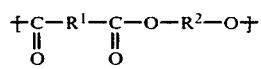

wherein R¹ stands for a phenylene group or an ethylene group, and R² stands for at least one group represented by the formula

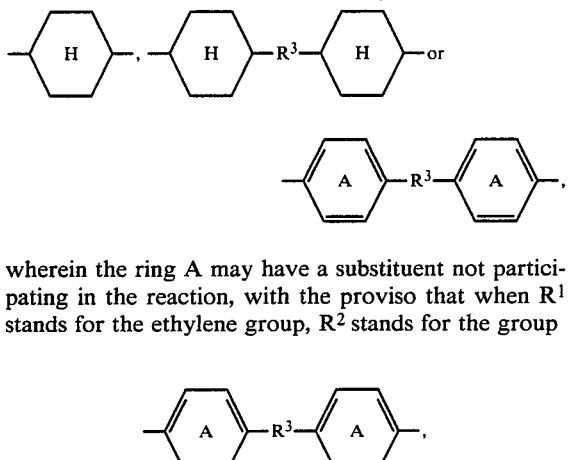

wherein the ring A may have a substituent not participating in the reaction, with the proviso that when R¹ stands for the ethylene group, R² stands for the group

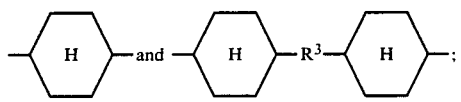

or one or both of

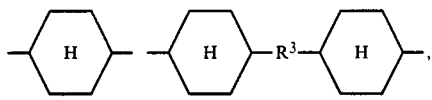

and when R¹ stands for the phenylene group, R² stands for one or both of

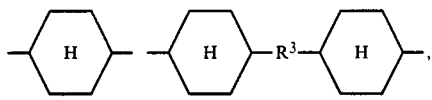

wherein R³ stands for

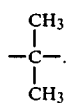

4. A photosensitive material as set forth in claim 3, wherein the charge-generating layer is formed from a composition formed by dispersing a charge-generating pigment in a thermoplastic polyester represented by said general formula, the thermoplastic polyester for the charge-generating layer is soluble in a chlorine type solvent but hardly soluble or insoluble in tetrahydrofuran or cyclohexanone, and the thermoplastic polyester for the charge transfer layer is soluble in tetrahydrofuran or cyclohexanone.

5. A photosensitive material for the electrophotography, which comprises an electroconductive substrate and a photosensitive layer formed on said substrate, said photosensitive layer comprising a charge transfer medium and a charge-generating pigment dispersed in said medium, wherein the photosensitive layer contains as the matrix resin a thermoplastic copolyester consisting essentially of recurring units represented by the following general formula:

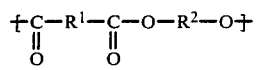

wherein R¹ stands for a phenylene group, and R² stands for a combination of (i)

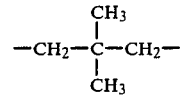

and (ii) a member selected from the group consisting of

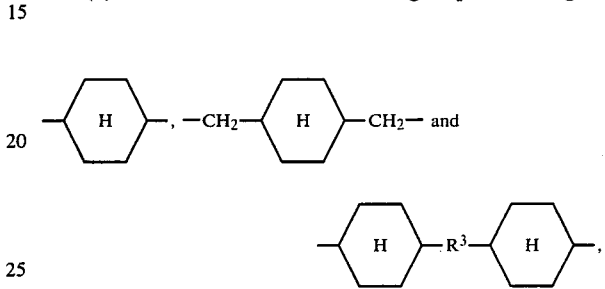

wherein R³ stands for a direct bond or a divalent bridging atom or group.

6. A photosensitive material for the electrophotography, which comprises an electroconductive substrate, a photoconductive organic pigment-containing, charge-generating layer formed on said substrate and a charge-transfer layer formed on said charge-generating layer, wherein the charge-transfer layer contains as the matrix resin a thermoplastic polyester consisting essentially of recurring units represented by the following general formula:

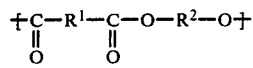

wherein R¹ stands for a phenylene group, and R² stands for a combination of (i)

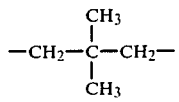

and (ii) a member selected from the group consisting of

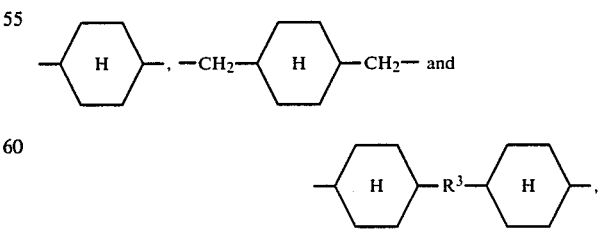

wherein R³ stands for a direct bond or a divalent bridging atom or group.

7. A photosensitive material as set forth in claim 6, wherein the charge-generating layer is formed from a composition formed by dispersing a charge-generating pigment in a thermoplastic polyester represented by said general formula, the thermoplastic polyester for the charge-generating layer is soluble in a chlorine type solvent but hardly soluble or insoluble in tetrahydrofuran or cyclohexanone, and the thermoplastic polyester for the charge transfer layer is soluble in tetrahydrofuran or cyclohexanone.

8. The photosensitive material of claim 1 wherein $R^1$ stands for the ethylene group, and $R^2$ stands for the group

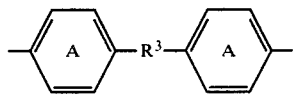

wherein $R^3$ stands for

9. The photosensitive material of claim 1 wherein $R^1$ stands for an ethylene group and $R^2$ stands for one or both of

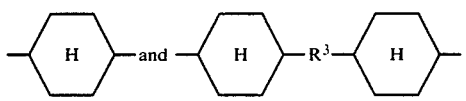

wherein $R^3$ stands for

10. The photosensitive material of claim 1 wherein $R^1$ stands for the phenylene group and $R^2$ stands for one or both of

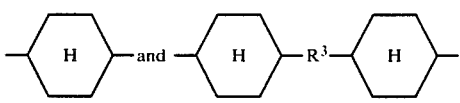

wherein $R^3$ stands for

11. The photosensitive material of claim 3 wherein $R^1$ stands for the ethylene group, and $R^2$ stands for

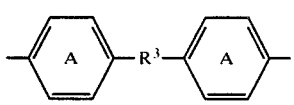

wherein $R^3$ stands for

12. The photosensitive material of claim 3 wherein $R^1$ stands for an ethylene group and $R^2$ stands for one or both of

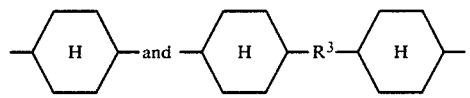

wherein $R^3$ stands for

13. The photosensitive material of claim 3 wherein $R^1$ stands for the phenylene group and $R^2$ stands for one or both of

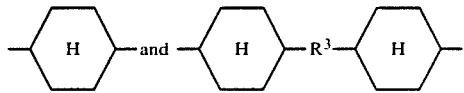

wherein $R^3$ stands for

14. The photosensitive material of claim 6 wherein the member (ii) is

15. The photosensitive material of claim 6 wherein the member (ii) is

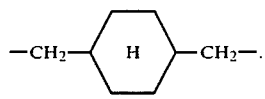

16. The photosensitive material of claim 6 wherein the member (ii) is

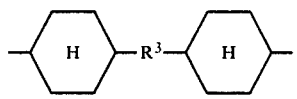

wherein $R^3$ is

* * * * *